(12) United States Patent
Schmidl et al.

(10) Patent No.: US 7,435,005 B2
(45) Date of Patent: Oct. 14, 2008

(54) SEAL FOR AN ANTIFRICTION BEARING

(75) Inventors: Matthias Schmidl, Fürth (DE);
Christian Riel, Seubersdorf (DE);
Hermann Stief, Emskirchen (DE)

(73) Assignee: Schaeffler KG, Herzogenaurach (DE)

( * ) Notice: Subject to any disclaimer, the term of this patent is extended or adjusted under 35 U.S.C. 154(b) by 379 days.

(21) Appl. No.: 10/565,087

(22) PCT Filed: May 26, 2004

(86) PCT No.: PCT/EP2004/005629
§ 371 (c)(1),
(2), (4) Date: Jan. 18, 2006

(87) PCT Pub. No.: WO2005/019696
PCT Pub. Date: Mar. 3, 2005

(65) Prior Publication Data
US 2006/0188190 A1    Aug. 24, 2006

(30) Foreign Application Priority Data
Jul. 24, 2003   (DE) ................. 103 33 673

(51) Int. Cl.
F16C 13/00   (2006.01)
F16C 33/80   (2006.01)

(52) U.S. Cl. ...................... 384/480; 384/546

(58) Field of Classification Search .......... 384/499, 384/477, 480, 488, 542, 543, 546, 586, 587, 384/588; 474/152, 166, 199; 277/347, 411, 277/412, 419
See application file for complete search history.

(56) References Cited

U.S. PATENT DOCUMENTS

| 2,281,905 | A  | * | 5/1942 | Young ................. 277/420 |
| 5,234,385 | A  |   | 8/1993 | Kawashima et al. |
| 6,287,014 | B1 |   | 9/2001 | Salla |
| 6,357,926 | B1 | * | 3/2002 | Hauck et al. ............ 384/546 |
| 7,011,593 | B2 | * | 3/2006 | Schenk et al. ............ 384/486 |
| 7,041,020 | B2 | * | 5/2006 | Singer ................. 474/166 |

FOREIGN PATENT DOCUMENTS

| DE | 41 33 777    | 4/1993  |
| DE | 93 07 931    | 9/1993  |
| DE | 296 09 380   | 9/1996  |
| DE | 296 12 471   | 10/1996 |
| DE | 100 24 318   | 11/2001 |
| EP |      241810  | 10/1987 |
| FR |   2 751 392  | 1/1998  |
| JP |   100 19 101 | 1/1998  |
| WO | WO 02/48562  | 6/2002  |

* cited by examiner

Primary Examiner—Thomas R Hannon
(74) Attorney, Agent, or Firm—Volpe and Koenig P.C.

(57) ABSTRACT

The invention relates to a tension roller (1) for a fraction drive, comprising a washer (2) mounted on an antifriction bearing and a spacer (4a). A sealing cap (13a) is provided between the washer (2) and the spacer (4a) and allows for a captivated arrangement of all components of the tension roller.

18 Claims, 3 Drawing Sheets

SEAL FOR AN ANTIFRICTION BEARING

BACKGROUND

The invention relates to a seal for an antifriction bearing of a tension roller or a deflection roller, which is positioned using a spacer. The seal comprises a sealing cap, which covers an annular gap between an inner bearing ring and an outer bearing ring of the antifriction bearing. The sealing cap rotates with a bearing ring and is spaced axially from the rolling bodies of the antifriction bearing, and is guided while maintaining a sealing gap to the spacer.

German published application DE 41 33 777 A1 shows the construction of a tension roller for a traction drive. The roller-supported tension roller comprises an inner bearing ring, which is arranged on an adjusting bushing in connection with a spacer washer and mounted on the housing, especially the crankcase of an internal combustion engine via a separate attachment bolt. The known tension roller features no measure for connecting the spacer captively to the tensioning device in the preassembled state of the tensioning device. The known seal is unsuitable for vehicles used for off-road driving, which is associated with traveling through water or with a large amount of dirt entering into the installation space provided for the internal combustion engine.

Furthermore, for achieving a defined installation position it is known to provide tension rollers with a spacer, on which preferably the inner ring of the antifriction bearing is positioned. Attachment means, especially a threaded connector, are guided through the longitudinal bore hole of the spacer and the bearing inner ring, in order to fix the structural unit, the tension roller, and also the spacer, for example, to an internal combustion engine. Such spacers have a centering shoulder for holding the inner bearing ring and also a flange, which extends radially over the entire end-side contour of the antifriction bearing. On the outside, the flange, with a cylindrical collar, covers a hub region of a running wheel, which is connected free of rotational play to the outer bearing ring of the antifriction bearing. This known construction requires a securing device for the spacer to the tension roller during the assembly, for example in the form of a separate securing device, which is unnecessary after successful assembly of the tension roller.

SUMMARY

The invention is based on the objective of providing a tension roller, which can be assembled easily and economically and whose associated spacer is connected captively to the tension roller.

This objective is realized according to the features of claim 1. Accordingly, the tension roller or deflection roller according to the invention comprises a sealing cap, which is mounted detachably indirectly or directly to the outer bearing ring of the tension roller with a positive and/or frictional fit. Furthermore, the sealing cap is designed with play and connected to the spacer providing the formation of a sealing labyrinth. According to the invention, the sealing cap enables a structural unit, for which the components, the tension roller, the spacer, and also the sealing cap are connected captively to each other. Thus, the entire structural unit can be fed preassembled to a mounting device, which, for example, automatically mounts the structural unit according to the invention on the internal combustion engine. The invention reduces the cycle times for assembly and enables assembly that is optimized in terms of cost.

In the construction of the tension roller or deflection roller according to the invention, the roller comprises a running wheel, which surrounds the antifriction bearing on the outside and on which the traction means of the traction drive are guided. The antifriction bearing is preferably centered with a positive fit on a spacer, wherein the structural unit comprising the components of the tension roller and spacer is mounted detachably to a housing of the internal combustion engine.

According to the invention, advantageously, in comparison with the known state of the art, a sealing cap is allocated to the previously described component, the tension roller. Furthermore, the sealing lip fixed in position indirectly or directly on the outer bearing ring of the antifriction bearing detachably with a positive and/or frictional fit forms a sealing labyrinth with the spacer. For this purpose, the sealing labyrinth is shaped so that the spacer is connected captively and with play to the sealing cap. Consequently, the invention enables a structural unit, for which all of the components, namely the tension roller, the spacer, and also the sealing cap, are assembled captively.

Advantageous configurations of the invention are the subject matter of the dependent claims 2 to 18.

Advantageously, the tension roller comprises a plastic running wheel, which can also be designated as a plastic pulley, which surrounds the outer bearing ring of the antifriction bearing. This measure guarantees economical production of the running wheel through a plastic injection molding process, wherein this process enables direct injection molding around the outer bearing ring.

The plastic running wheel, which is advantageously provided with reinforcement ribs, possesses sufficient stiffness and has a weight advantage in comparison to a steel running wheel. Advantageously, the plastic running wheel is provided with an axially extending shoulder formed as a closed cylinder.

In an installation position, a cylindrical leg of the sealing cap overlaps the shoulder of the running wheel. Tabs of the leg connected integrally to the cylindrical leg and directed advantageously partially radially inwards engage in a snap-on groove shape of the axially extending shoulder of the running wheel, shaped as a circular ring groove.

The sealing cap according to the invention is provided advantageously with at least one, preferably with several symmetrical bore holes or openings in the cylindrical leg of the sealing cap. The shape or arrangement of the bore holes is set, so that contaminant particles or fluids can be discharged from an annular gap limited by the antifriction bearing and the sealing cap. The discharge of contaminants due to centrifugal force in the operating state, i.e., when the tension roller is rotating, can be optimized by beveling the contours of the axial shoulder of the track roller in order, in this way, to optimize the discharge of contaminants from the intermediate space formed as an annular gap.

A rotationally fixed attachment of the sealing cap to the running wheel of the tension roller is desirable. For this purpose, it presents itself according to the invention to provide the sealing cap with an axially directed projection, which engages in an installation position with a positive fit in an end recess of the axial shoulder. Furthermore, the invention includes alternative solutions in order to create an effective rotational lock between the track roller and the sealing cap.

A configuration of the sealing labyrinth according to the invention between the sealing cap and the spacer provides that the radial leg of the sealing cap engages with play in an annular groove of the spacer. The engagement of the leg in the annular groove is designed structurally so that it is optimized in terms of assembly on one hand and the sealing effect on the other hand. For this purpose, in particular a radial overlap of ≧0.5 mm between the inner contours of the sealing cap and the wall height on the spacer in the region of the annular groove is suitable. Here, the radial overlap can be affected by the material selection of the sealing cap and also the structural shape, in that this exhibits a certain elasticity. Therefore, for assembly a certain radial excursion of the radial leg of the sealing cap is set, wherein this automatically returns elastically when reaching the annular groove in the spacer and engages in the annular groove with play. For simplifying the assembly or for preventing damage, especially to the sealing cap, this has reduced wall thickness zones advantageously distributed peripherally in the region of the radial leg. This measure, advantageously combined with a circular bevel, on the end on the relevant outer surface of the spacer and also on the inside on the radial leg of the sealing cap, creates a simplified, nondestructive assembly of the sealing cap.

For improving the effect of the sealing labyrinth, the annular groove in the spacer is defined by groove walls, whose heights are different from each other. The annular groove facing away from the antifriction bearing exceeds the height of the opposite annular groove, so that overall an extended sealing gap is set in the region of the sealing labyrinth. This construction principle decisively improves the sealing quality and thus reduces the entrance of contaminants or fluids via the sealing gap of the sealing labyrinth into the interior between the antifriction bearing and the sealing cap when the internal combustion engine is running.

According to the invention, the invention further includes the shape of a spacer, whose radial leg is allocated with play in the installation position on a shoulder, which is formed between the antifriction bearing and the sealing cap. This shape is suitable for an assembly of the sealing cap, according to which the antifriction bearing in connection with the track roller is positioned on a centering pin of the spacer, before the sealing cap can then be fixed to the track roller fed axially over the spacer.

A defined allocation of the components, antifriction bearing, and spacer is achieved advantageously by the spacer having a centering collar or a centering pin, on which the inner bearing ring of the antifriction bearing is pressed. This construction guarantees a proper angle alignment of the antifriction bearing necessary for the function of the traction drive in connection with the track roller on the spacer.

As a measure for simplifying the assembly, according to the invention, the cylindrical rim of the sealing cap is also provided with cuts distributed peripherally, which extend in a limited way into the radial leg. During assembly, the rim can thus recede radially in a nondestructive manner.

In another advantageous configuration of the invention, the sealing cap is provided with crimping in the region of the radial leg. This feature enables, for one, a defined axial distance of the sealing labyrinth to the antifriction bearing. Furthermore, the crimping improves the elasticity of the sealing cap, whereby, in particular, the assembly of the sealing cap in an annular groove of the spacer is simplified.

As an alternative to an arrangement of the sealing cap with play on the spacer in the region of the sealing labyrinth, according to the invention it is possible to provide a seal, especially a felt ring. This felt ring reduces the sealing gap and optimizes the sealing effect without disadvantageous, long-lasting contact on the spacer. Thus, the seal quality is improved without simultaneously affecting the mechanical loading of the antifriction bearing due to higher component temperatures.

As an alternative to a felt seal or a felt ring in the region of the sealing labyrinth, according to the invention a grease collar can be provided on the inside on the radial leg of the sealing cap. For this purpose, a high viscosity, semifluid grease is suitable, which adheres permanently to the sealing cap and thus also supports the sealing effect.

The sealing cap according to the invention can be produced without cutting from a metallic material by a deep-drawing process. Alternatively, a plastic sealing cap is suitable, whereby an injection molding process that is economical for large quantities is possible.

BRIEF DESCRIPTION OF THE DRAWINGS

In the figures, tension rollers are shown in connection with differently formed sealing caps according to the invention. Shown are.

DETAILED DESCRIPTION OF THE PREFERRED EMBODIMENTS

Figure 1:
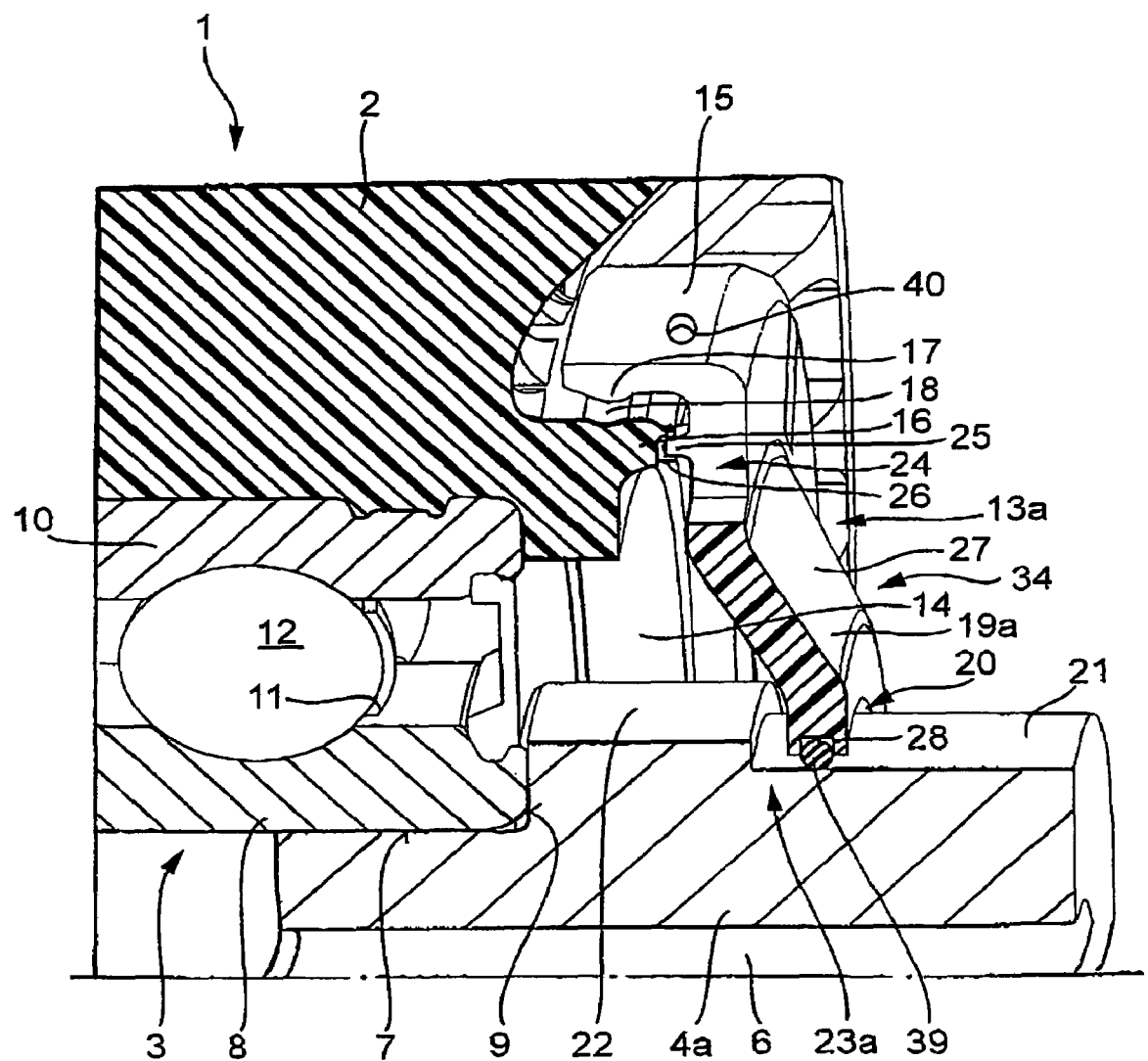
FIG. 1 a tension roller in a half section, whose sealing cap forms a sealing labyrinth with a shoulder of the spacer.

FIG. 1 shows a tension roller 1, whose construction comprises a running wheel 2, which is produced from plastic and which can rotate relative to a spacer 4a through the use of an antifriction bearing 3. In the installed state, the tension roller 1 is guided through a longitudinal bore hole 6 of the spacer 4a and fixed to the antifriction bearing 3 supported threaded connector 5. The spacer 4a is provided with a centering collar 7, on which an inner ring 8 of the antifriction bearing 3 is positioned preferably by a press fit and is supported on the end on a shoulder 9 of the spacer 4a. An outer ring 10 of the antifriction bearing 3 is surrounded on the outside by the running wheel 2 and thus connected with a positive fit. Rolling bodies 12 guided in a cage 11 are arranged between the inner ring 8 and outer ring 10 of the antifriction bearing 3 spaced radially apart from each other.

Furthermore, the tension roller 1 provides a sealing cap 13a, which seals, on one side, an annular gap 14 set between the spacer 4a and the running wheel 2 and furthermore guarantees a captive connection of the spacer 4a to the tension roller 1. For this purpose, the sealing cap 13a is positioned on a shoulder 16 of the running wheel 2 through a cylindrical rim 15. Here, the cylindrical rim 15 overlaps the axially extending shoulder 16 and is here connected with a positive fit by partially radially inwardly directed tabs 17 with a positive fit in an annular groove 18, which has a snap-on roller shape, of the shoulder 16. With a radially inwardly directed leg 19a, the sealing cap 13a is guided to an outer surface 21 of the spacer 4a while maintaining a sealing gap 20. The free end of the radial leg 19a is furthermore spaced axially from a radial shoulder 22 of the spacer 4, so that a sealing labyrinth 23a is located between the radial leg 19 and the spacer 4a.

Furthermore, a rotational lock 24 is provided between the sealing cap 13a and the running wheel 2. For this purpose, an axially aligned projection 25 of the sealing cap 13a engages with a positive fit in a correspondingly shaped recess 26 of the axially directed shoulder 16 of the running wheel 2. The radial leg 19a of the sealing cap 13a further comprises a crimped section 27, with which a defined distance between the antifriction bearing 3 and the sealing cap 13a can be defined. Furthermore, the crimped section 27 enables a certain elasticity in order to simplify the assembly of the sealing cap 13a.

As a measure to reduce the sealing gap 21, it is also possible provide on the inside of the radial leg 19a an annular groove 28 for holding a sealing ring. For this purpose, a felt ring 39 is suitable, which is guided on the outer surface 21 of the sealing cap 13a, after a start-up phase forms a tightly defined sealing gap. The sealing cap 13a is also provided with at least one bore hole 40 in the region of the cylindrical rim 15. The bore hole 40 has the task of being able to discharge contaminants let into the annular gap 14 in the operating state, i.e., when the running wheel 2 is rotating, based on centrifugal force.

Figure 2:
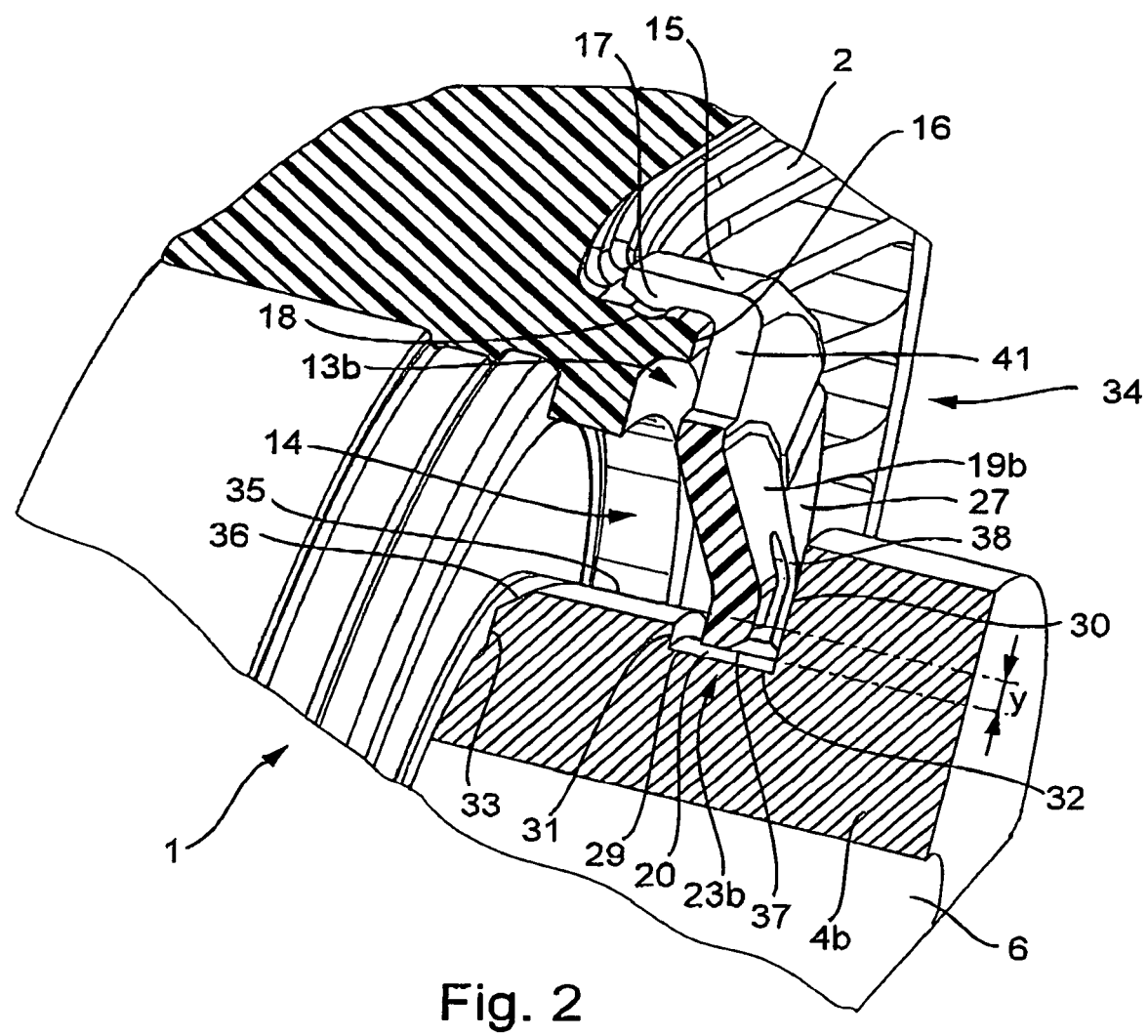
FIG. 2 a tension roller, in which the associated sealing cap engages in an annular groove of the spacer for forming a sealing labyrinth.

FIG. 2 shows the tension roller 1 having a structure that, for the most part, is the same as that shown in FIG. 1. Below, the differences are explained relative to the tension roller 1 illustrated in FIG. 1. The spacer 4b forms an annular groove 29, in which the free end of the radial leg 19b of the sealing cap 13b engages with play in a positive fit. For this purpose, the free end of the radial leg 19b is axially at a distance in the installation position to the groove walls 30, 31 and a groove base 32 of the annular groove 29. This arrangement forms the sealing labyrinth 23b. FIG. 2 shows the sealing cap 13b in the installation position, in which a radial overlap "Y" between inner contours of the radial leg 19b of the sealing cap 13b and the groove wall 31 or the outer surface 35 of the spacer 4b attached thereto is set. Through the radial overlap "Y" in connection with the positive-fit attachment of the sealing cap 13b to the running wheel 2, as explained in the description to FIG. 1, a captive arrangement of all components of the tension roller 1 is set for forming a structural unit 34. The spacer 4b and also the sealing cap 13b are provided with structural measures in order to simplify the assembly of these components. The spacer 4b has a circular outer bevel 36 on the end in a transition zone between the shoulder 33 and an outer surface 35. Adapted for this purpose, the radial leg 19b of the spacer 4a is provided with an inner bevel 37, which together simplify the assembly of the components, the sealing cap 13b and the spacer 4b.

As another measure, which simplifies assembly, the sealing cap 13b is provided in the region of the radial leg 19b partially with zones 38, which extend radially starting from the inner contours and which have a small wall thickness, whereby for the assembly of the sealing cap 13b onto the spacer 4b, the radial leg 19b can expand radially more easily and thus produces a nondestructive assembly. The wall thickness reduced zone 38 has a positive effect especially in connection with the crimped section 27 in the region of the radial leg 19b in order to achieve a desired elasticity of the sealing cap 13b, which is necessary for nondestructive assembly. As an alternative to different wall thicknesses, length-limited radial cuts in the region of the zone 38 are suitable. As further assembly simplification, the sealing cap 13b is provided with cuts 41, which extend over the entire length of the cylindrical rim 15 and reach into the leg 19b.

Figure 3:
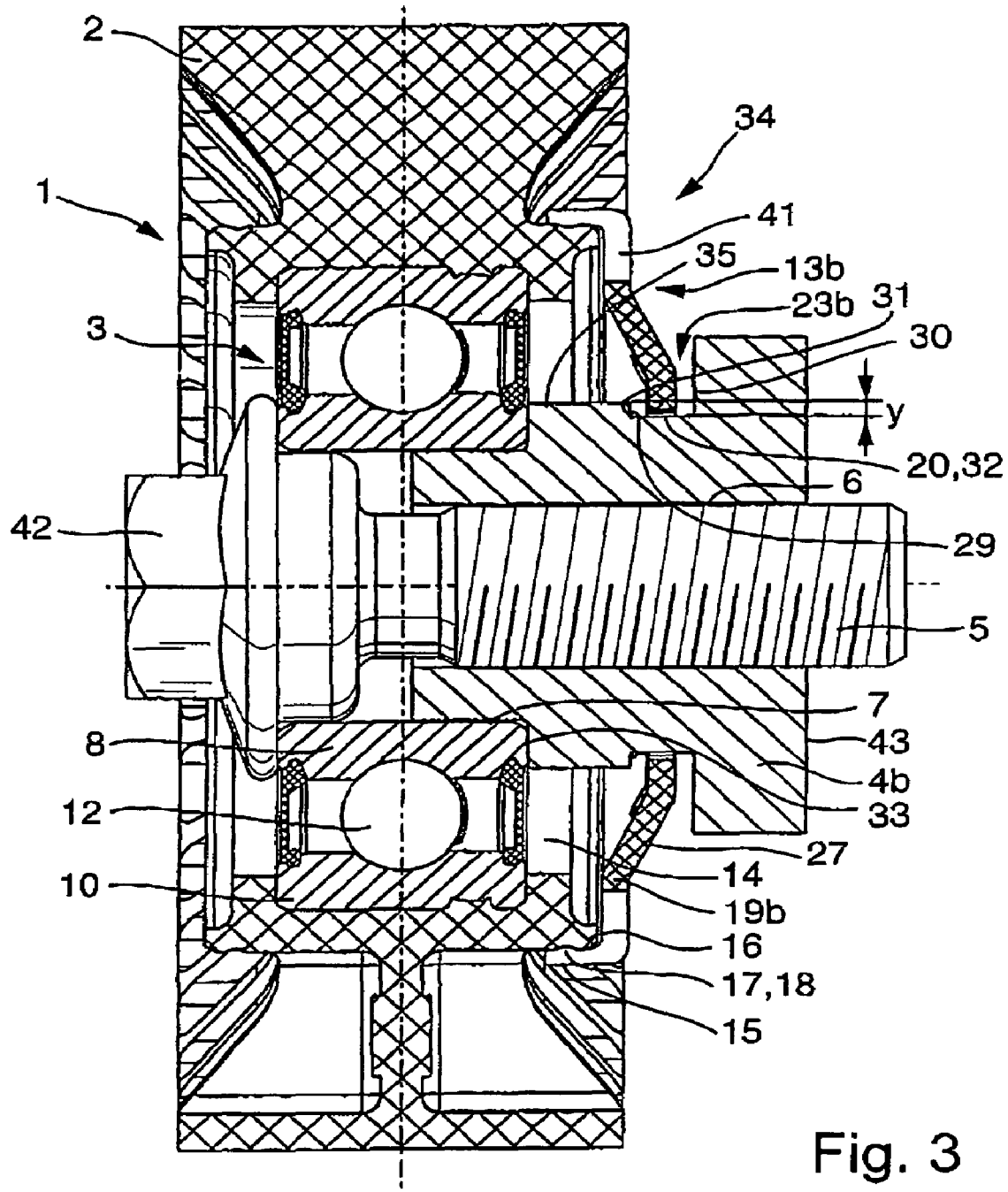
FIG. 3 the tension roller according to FIG. 2 in a longitudinal section.

FIG. 3 shows the tension roller 1 in longitudinal section, which forms the structural unit 34 together with the sealing cap 13b and also the spacer 4b. This illustration also includes a threaded connector 5, with which the structural unit can be fixed detachably, for example, to a housing of an internal combustion engine not shown in FIG. 3. For this purpose, the threaded connector 5 is inserted into the longitudinal bore hole 6 of the spacer 4b. The connector head 42 is supported flat on the inner ring 8 of the antifriction bearing 3. In the installation position, the threaded connector 5 creates a frictional, tensioned support of the inner ring 8 on the shoulder 33 of the spacer 4b, which is supported on the internal combustion engine by an end side 43 thereof.

REFERENCE SYMBOLS

1 Tension roller
2 Running wheel
3 Antifriction bearing
4a Spacer
4b Spacer
5 Threaded Connector
6 Longitudinal bore hole
7 Centering collar
8 Inner ring
9 Shoulder
10 Outer ring
11 Cage
12 Rolling body
13a Sealing cap
13b Sealing cap
14 Annular gap
15 Rim
16 Shoulder
17 Tab
18 Annular groove
19a Leg
19b Leg
20 Sealing gap
21 Outer surface
22 Shoulder
23a Sealing labyrinth
23b Sealing labyrinth
24 Rotational lock
25 Projection
26 Recess
27 Crimped section
28 Annular groove
29 Annular groove
30 Groove wall
31 Groove wall
32 Groove base
33 Shoulder
34 Structural unit
35 Outer surface
36 Outer bevel
37 Inner bevel
38 Zone
39 Sealing ring
40 Bore hole
41 Cut
42 Screw head
43 End

The invention claimed is:

1. Tension roller or deflection roller for a traction drive, comprising an antifriction bearing (3), having an inner ring (8) positioned by a spacer (4a, 4b) and a threaded connector (5), with traction means adapted to be guided on a running wheel (2) of the tension roller (1) located on an outer ring (10) of the antifriction bearing (3), wherein the antifriction bearing (3) includes, at least on one side, an axially spaced sealing cap (13a, 13b), which overlaps an annular gap (14) between the inner ring (8) and the outer ring (10),wherein the sealing cap (13a, 13b) is fixed detachably with at least one of a positive or frictional fit indirectly to the outer ring (10) of the antifriction bearing (3)and forms a sealing labyrinth (23a, 23b) with the spacer (4a, 4b), and the sealing caps (13a, 13b) are connected to the spacer (4a, 4b) so that the spacer (4a, 4b) and sealing cap (13a, 13b) are joined captively into one structural unit (34) with the tension roller (1).

2. Tension roller according to claim 1, wherein the outer ring (10) of the antifriction bearing (3) is surrounded by the running wheel (2), which is a pulley produced from plastic.

3. Tension roller according to claim 1, wherein the running wheel (2) comprises an axially extending shoulder (16) with a ring groove (18), formed with a snap-on roller shape for the sealing cap (13a, 13b).

4. Tension roller according to claim 3, wherein the sealing cap (13a, 13b) overlaps the axially extending shoulder (16) of the running wheel (2) in an installation position with a cylindrical rim (15) and locks into the ring groove (18) of the shoulder (16) with at least partially radially inwardly directed tabs (17).

5. Tension roller according to claim 4, wherein the sealing cap (13a) has at least one radially directed bore hole (40) or opening in a region of the cylindrical rim (15).

6. Tension roller according to claim 4, wherein an axially directed projection (25) of the sealing cap (13a) engages in an end recess (26) of the shoulder (16) connected integrally to the running wheel (2) to form a rotational lock (24).

7. Tension roller according to claim 4, wherein the cylindrical rim (15) of the sealing cap (13b) has peripherally distributed cuts (41), which extend for a limited length into a radial leg (19b).

8. Tension roller according to claim 1, wherein the sealing cap (13b) engages in a positive fit, with play, in an annular groove (29) of the spacer (4b), which is formed axially offset to a shoulder (33) of the spacer (4b), on which the inner ring (8) of the antifriction bearing (3) is supported.

9. Tension roller according to claim 8, wherein a radial overlap "Y" of $\geq 0.5$ mm is provided between inner contours of a radial leg (19b) of the sealing cap (13b) and a groove wall (31) or outer surface (35) of the spacer (4b).

10. Tension roller according to claim 8, wherein a radial leg (19b) of the sealing cap (13b) which is part of the sealing labyrinth (23b) is provided with partial wall thickness reduced zones (38) distributed peripherally.

11. Tension roller according to claim 8, wherein the annular groove (29) is defined in the spacer (4b) by groove walls (30, 31), having heights that are different from each other.

12. Tension roller according to claim 1, wherein the sealing cap (13a) has a radial leg (19a) that is allocated with play to a radial shoulder (22) of the spacer (4a).

13. Tension roller according to claim 1, wherein the antifriction bearing (3) is positioned on a centering collar (7) of the spacer (4a) and is supported on a shoulder (9).

14. Tension roller according to claim 1, in which a radical leg (19a, 19b) of the sealing cap (13a, 13b) has a crimped section (27) for providing a defined axial distance of the sealing labyrinth (23a, 23b) to the antifriction bearing (3).

15. Tension roller according to claim 1, in wherein a radial leg (19a) of the sealing cap (13a) comprises a sealing ring (39) in a region of the sealing labyrinth (23a).

16. Tension roller according to claim 1, wherein the sealing cap (13a, 13b) includes a circular grease collar in a region of the sealing labyrinth (23a, 23b).

17. Tension roller according to claim 1, wherein the sealing cap (13a, 13b) is produced without cutting from a metallic material.

18. Tension roller according to claim 1, wherein the sealing cap (13a, 13b) is produced from an elastic material.

* * * * *